(12) United States Patent
Neumann

(10) Patent No.: US 7,047,865 B2
(45) Date of Patent: May 23, 2006

(54) CYLINDER WITH FIBER OPTICAL POSITION SENSING DEVICE

(75) Inventor: Ulrich W. Neumann, Canfield, OH (US)

(73) Assignee: Parker-Hannifin, Cleveland, OH (US)

( * ) Notice: Subject to any disclaimer, the term of this patent is extended or adjusted under 35 U.S.C. 154(b) by 0 days.

(21) Appl. No.: 11/011,388

(22) Filed: Dec. 14, 2004

(65) Prior Publication Data

US 2005/0120875 A1    Jun. 9, 2005

Related U.S. Application Data

(63) Continuation of application No. 10/336,264, filed on Jan. 2, 2003, now Pat. No. 6,834,574.

(60) Provisional application No. 60/346,224, filed on Jan. 4, 2002.

(51) Int. Cl.
*F01B 25/26* (2006.01)

(52) U.S. Cl. .............................................. 91/1; 92/5 R

(58) Field of Classification Search ............ 91/1; 92/5 R

See application file for complete search history.

(56) References Cited

U.S. PATENT DOCUMENTS

| | | |
|---|---|---|
| 3,013,826 A | 12/1961 | Sharp |
| 3,284,088 A | 11/1966 | Pippert |
| 4,055,107 A | 10/1977 | Bartley |
| 4,170,726 A | 10/1979 | Okuda |
| 4,335,295 A | 6/1982 | Fowler |
| 4,347,785 A | 9/1982 | Chase et al. |
| 4,406,939 A | 9/1983 | Golker |
| 4,533,815 A | 8/1985 | Ecer |
| 4,547,649 A | 10/1985 | Butt et al. |
| 4,701,615 A | 10/1987 | Schmitt |
| 4,758,705 A | 7/1988 | Hertzel et al. |
| 4,765,063 A | 8/1988 | Sing |
| 4,901,073 A | 2/1990 | Kibrick |
| 5,106,455 A | 4/1992 | Jacobsen et al. |
| 5,172,485 A | 12/1992 | Gerhard et al. |
| 5,287,630 A | 2/1994 | Geisler |
| 5,298,717 A | 3/1994 | DeRossett, Jr. |
| 5,301,434 A | 4/1994 | Imaizumi |
| 5,424,508 A | 6/1995 | Swain et al. |
| 5,455,509 A * | 10/1995 | Semura et al. ................ 92/5 R |

(Continued)

OTHER PUBLICATIONS

Focus on Lasers, "Laser Marking For Fabricators", *The Fabricator*, May/Jun. 1990.

(Continued)

*Primary Examiner*—Thomas E. Lazo
(74) *Attorney, Agent, or Firm*—Daniel J Whitman; Joseph J. Pophal

(57) ABSTRACT

A fluid-pressure actuated piston/cylinder assembly having a sensor capable of reading at least one indicia marking on a piston rod in order to determine the movement and specific location of the piston rod and cylinder relative to each other. The sensor is housed within a sealing gland that is incorporated into the piston/cylinder assembly and is isolated from the fluid pressure and external elements outside of the assembly. The method of providing a compact, accurate position detecting system for the noted piston/cylinder assembly is also set forth.

11 Claims, 10 Drawing Sheets

U.S. PATENT DOCUMENTS

| | | |
|---|---|---|
| 5,456,020 A | 10/1995 | Kellner |
| 5,539,993 A | 7/1996 | Kilpinen et al. |
| 5,568,760 A * | 10/1996 | Volzer .......................... 92/5 R |
| 5,607,165 A | 3/1997 | Bredemeyer |
| 5,632,916 A | 5/1997 | Lappalainen et al. |
| 5,642,793 A * | 7/1997 | Lj.o slashed.sne ........... 92/5 R |
| 5,886,317 A | 3/1999 | Hinrichs et al. |
| 6,234,061 B1 | 5/2001 | Glasson |
| 6,327,791 B1 * | 12/2001 | Norcross et al. ............... 33/706 |
| 6,452,158 B1 * | 9/2002 | Whatley et al. ........ 250/231.13 |
| 6,533,596 B1 * | 3/2003 | Demuth et al. ............. 439/320 |
| 6,834,574 B1 * | 12/2004 | Neumann ..................... 92/5 R |

OTHER PUBLICATIONS

Technology Review, "Position Transducers Provide System Feedback", *Hydraulics & Pneumatics*, Apr. 2000.

"Tool Maker Turns to Laser-Etching", *Modern Machine Shop*, Apr. 1990.

* cited by examiner

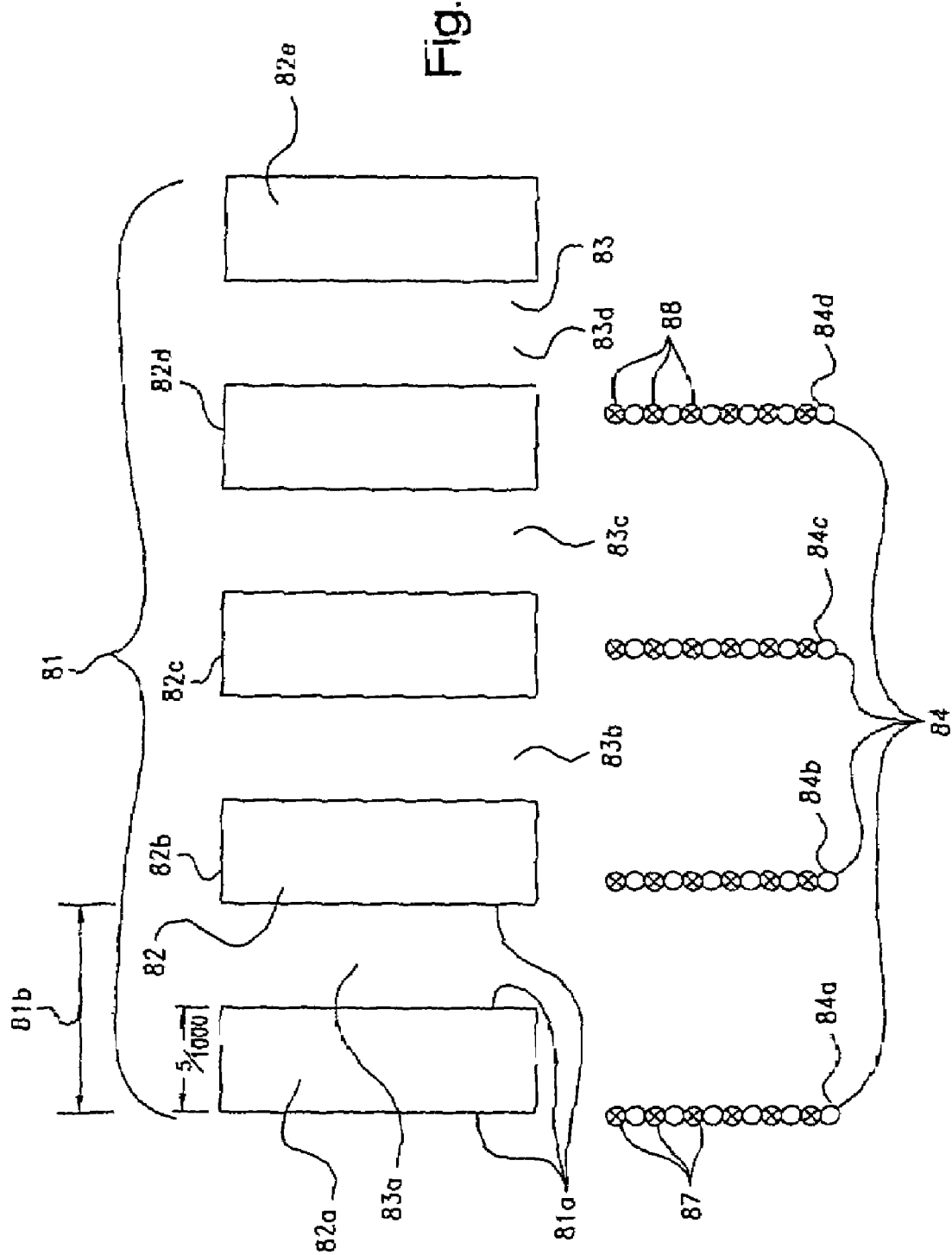

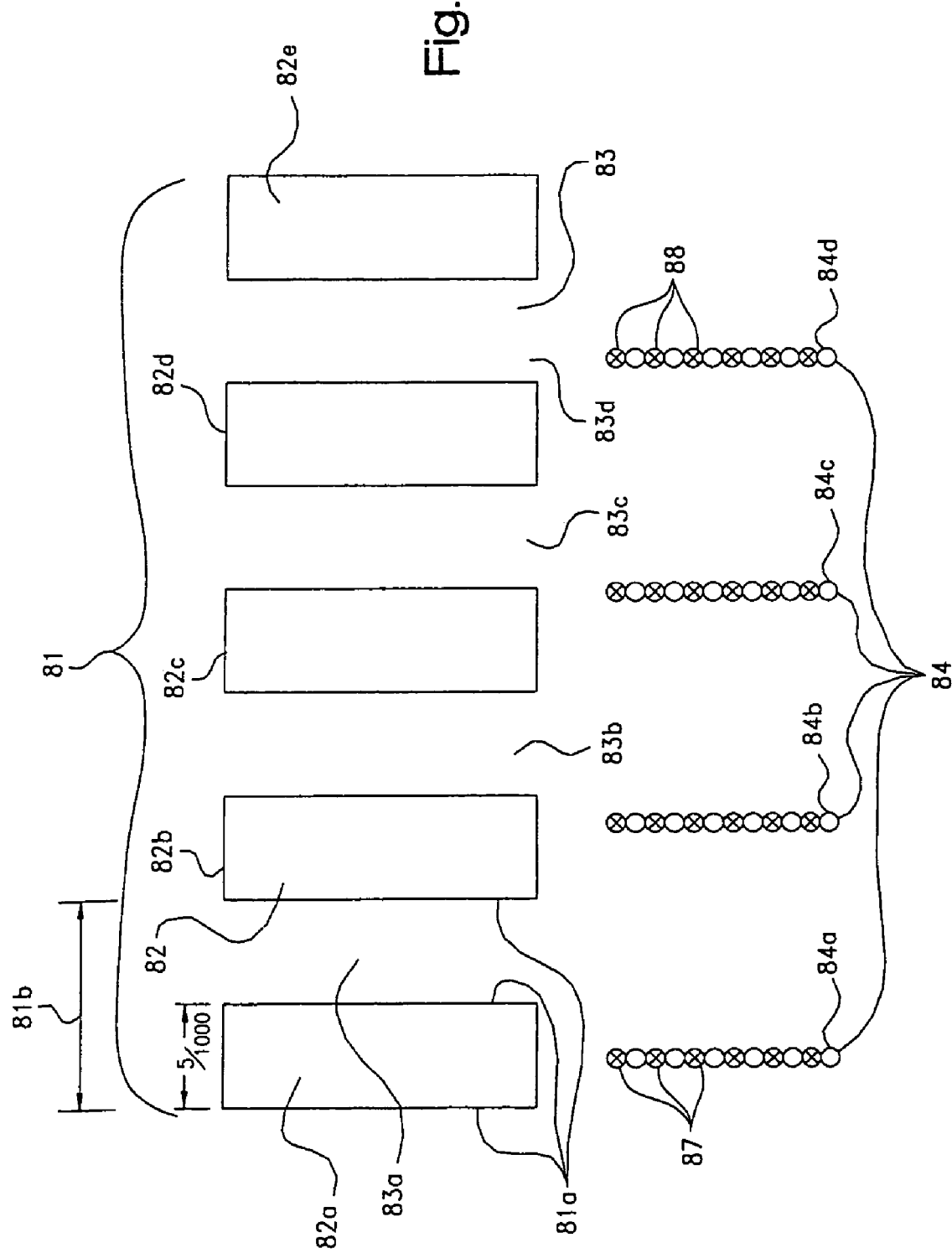

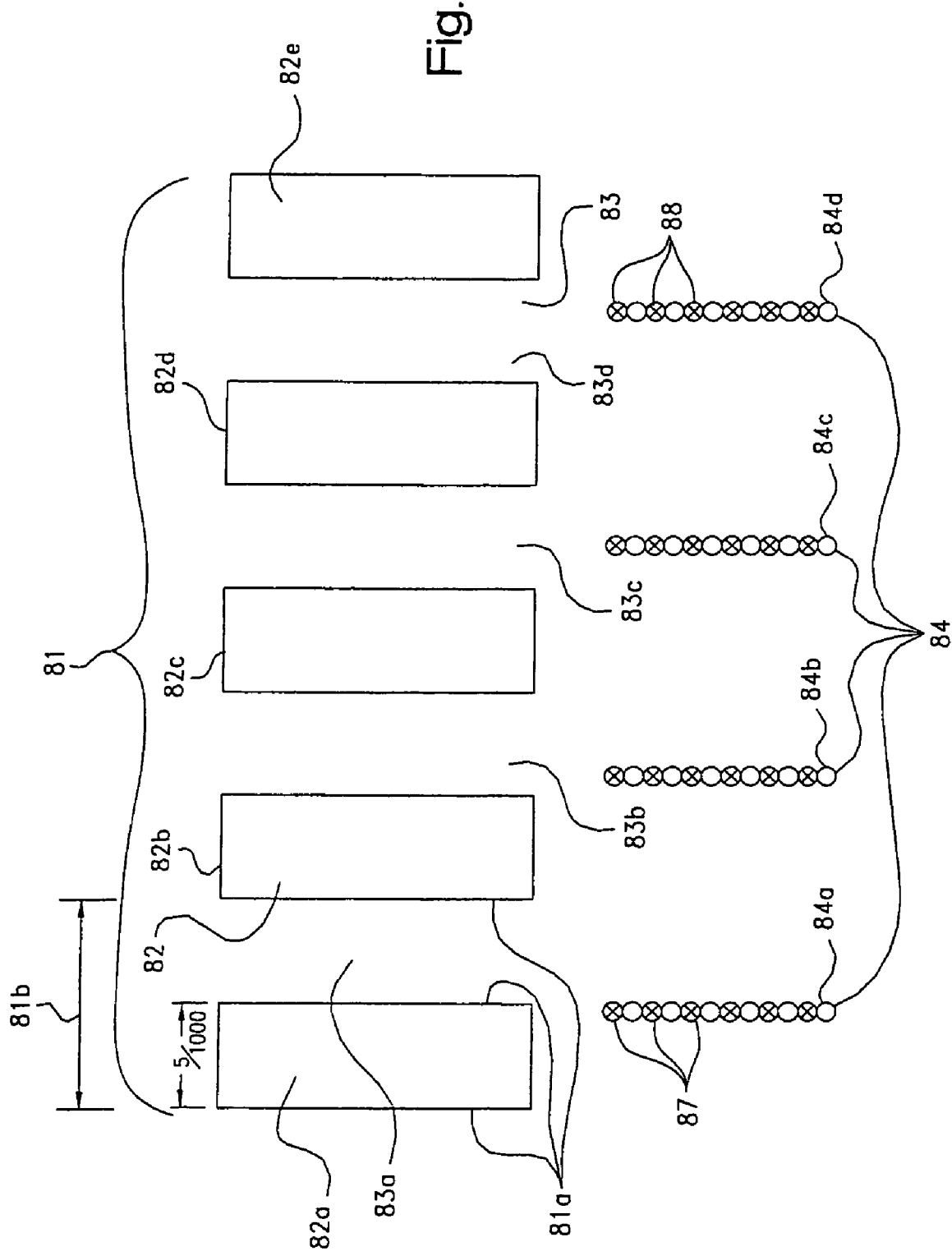

CYLINDER WITH FIBER OPTICAL POSITION SENSING DEVICE

CROSS REFERENCE TO RELATED APPLICATIONS

This Application is a continuation of U.S. patent application Ser. No. 10/336,264, which was filed on Jan. 2, 2003 now U.S. Pat. No. 6,834,574, and claiming priority from U.S. Provisional Patent Application Ser. No. 60/346,224, which was filed on Jan. 4, 2002. The disclosures of which are expressly incorporated herein by reference.

BACKGROUND OF THE INVENTION

Piston-cylinder assemblies are used in various actuator applications throughout industry. It is advantageous for an operator to be aware of the specific position of a piston rod in a fluid pressure operated cylinder since the working member being actuated is generally physically connected to the distal end of the piston rod. In order to effectively accomplish this task, several aspects have to be included in the design of such an assembly. Specifically, a readable scale has to be applied to the piston rod, and a sensing device capable of reading the scale has to actually read the scale and communicate this reading, in terms of the specific location of the piston rod, to the operator.

In the past, surfaces have been marked in various ways. Lasers have been used to treat surfaces in order to provide readable scales. An example of a laser marking technique is shown in U.S. Pat. No. 4,547,649 to Butt et al. This patent adds an oxidized layer to a surface and then makes color contrasting marks on this surface that can be detected. Other examples of using lasers to create markings are shown in the following prior art: U.S. Pat. No. 4,533,815 to Ecer; U.S. Pat. No. 4,758,705 to Hertzel et al.; U.S. Pat. No. 4,170,726 to Okuda; U.S. Pat. No. 4,335,295 to Fowler; U.S. Pat. No. 4,347,785 to Chase et al.; U.S. Pat. No. 4,406,939 to Golker; U.S. Pat. No. 5,298,717 to DeRossett, Jr.; U.S. Pat. No. 5,424,508 to Swain et al.; and U.S. Pat. No. 5,886,317 to Hinrichs et al. These prior art patents all use laser technology to remove material from the treated surface. Removal of material from the piston rod surface can create difficulties with providing a complete seal around the piston rod. Without a complete seal, pressure can be lost at these areas and contaminants can infiltrate the system.

In order to ensure that the piston-cylinder assembly is properly sealed, other inventions have treated surfaces without altering the surface geometry of the piston rod. This type of invention is shown in prior art U.S. Pat. No. 5,632,916 to Lappalainen et al. This invention also uses a laser to form a scale without altering the surface geometry that is being marked.

Various other coding scales have been applied to surfaces in the past. For example, U.S. Pat. No. 4,901,073 to Kibrick uses a bar code for determining the position of a movable member relative to a stationary member. U.S. Pat. No. 4,701,615 to Schmitt details the use of a binary code that assists in determining the direction of travel and the position of two objects relative to each other. U.S. Pat. No. 5,632,916 to Lappalainen et al., previously referenced, shows a method of using a laser to create discolorations on a metal surface that can be optically read. In these cases, the treated surfaces are not geometrically altered.

As previously mentioned, a proper seal is required to ensure that the pressure inside the piston-cylinder assembly is not lost. A seal also can provide a way of eliminating any outside contaminants that may possibly enter the enclosed piston-cylinder assembly via reciprocation between the piston rod and the cylinder. The prior art has identified various ways of providing a proper seal. The following prior art sets forth sealing techniques for cylindrical objects: U.S. Pat. No. 3,013,826 to Sharp; U.S. Pat. No. 3,284,088 to Pippert; U.S. Pat. No. 4,055,107 to Bartley; and U.S. Pat. No. 5,607,165 to Bredemeyer.

In order to determine the specific position of the piston rod, a sensor is used to read the coding scales. Different types of sensors have been used in the past. For example, U.S. Pat. No. 5,172,485 to Gerhard et al. uses a position sensor that measures the capacitance between two objects. In U.S. Pat. No. 5,455,509 to Semura et al., a magnetic sensor is used to detect the stroke position of a cylinder. U.S. Pat. No. 6,234,061 B1 to Glasson uses a rotating spool to communicate with a transducer in order to sense the position of a piston rod. U.S. Pat. No. 5,539,993 to Kilpinen sets forth a light emitting and light receiving fiber optic sensor to detect the absolute position of a moving object. Finally, a report in the industry magazine *Hydraulic & Pneumatics*, April 2000 edition, titled "Position transducers provide system feedback", sets forth several devices that provide position information for fluid-power control systems.

SUMMARY OF THE PRESENT INVENTION

The present invention provides a compact, accurate position detecting system for a piston/cylinder assembly. This invention utilizes essentially existing piston-cylinder componentry and adds the capability of determining the exact location of a piston rod relative to its surrounding cylinder. This invention overcomes the prior art's inability of providing a simple, compact technique of detecting the position of a piston rod relative to the cylinder.

A feature of the present invention is to incorporate a sensor within the existing componentry. This invention overcomes difficulties in the prior art, which added an external sensor to the piston-cylinder assembly. External sensors are subject to harmful outside elements that can adversely affect the sensor's accuracy and shorten the sensor's life. For example, piston-cylinder assemblies are typically used on construction equipment. External componentry can come in contact with contaminants and into physical contact with various external objects, thus causing damage. Since a sensor is a precise instrument, any damage will impair or even totally eliminate its functionality. External componentry also adds unwanted size and complexity to the piston-cylinder assembly. In the present invention, the sensor is housed within an existing component, namely a sealing gland, which encapsulates the open end of the cylinder and receives a moving piston rod. By incorporating the sensor within the sealing gland, the size of the piston-cylinder assembly is generally not increased and the sensor is isolated from harmful elements.

Another feature of the present invention is to separate the sensor from any internal pressure inside the cylinder body. This is accomplished by providing seals within the seal gland, on both sides of a cavity that houses the sensor, thus isolating the sensor from the internal cylinder pressure and any external contaminants that may accumulate on the piston rod during its extension from the sealing gland.

Another feature of the present invention is to provide an easy way of removing and inserting the sensor. Due to its location within the seal gland, the piston-cylinder assembly does not have to be disassembled in order to replace the sensor. In addition, during the removal of the sensor from the seal gland, the piston/cylinder assembly will not lose pressure.

Another feature of the present invention is to determine the position of the piston rod relative to the cylinder without having to add an additional, externally mounted scale. This is preferably accomplished by subjecting the piston rod surface to a change in its molecular structure, resulting in the addition of a readable code to its surface. This code, for example in the form of indicia markings, is read by the sensor and can determine the position of the rod and the cylinder relative to each other. This is done without having to add another component.

A further feature includes adding the readable code, for example in the form of an incremental scale, to the piston rod surface without changing its surface geometry. This ensures a proper seal surrounding the piston rod. The prior art has provided codes or indicia markings that are laser etched into the surface of the piston rod. Laser etching alters the surface geometry of the piston rod, thus provided a leak path, around the seals, for fluids and contaminants. Laser etching of the surface geometry can also damage the seals and thus provide a leak path for the fluid and/or contaminants.

Another feature, as shown in a further embodiment, is that the piston rod surface can be treated at specific locations in order to provide an "end-of-stroke", and/or "mid-stroke", types of sensing. Certain applications may not need to determine the absolute position of the piston rod at all times during its stroke. Therefore it is a cost benefit to only include indicia markings at specific locations on the piston rod. For example, an operator of a piston/cylinder assembly may only want to know when the piston is in mid-stroke and/or at full stroke; therefore indicia marks can be included on the piston rod surface for defining the noted locations.

Another feature, as is shown in yet another embodiment, is that the position of the piston rod can be instantaneously determined. This is accomplished via an absolute scale encoded on the piston rod surface. In this embodiment the sensor is also positioned inside the sealing gland so that an external sensor component is not needed.

This invention also provides a method of determining the specific location of the piston rod and cylinder relative to each other. This is accomplished by providing markings on the piston rod and incorporating the componentry previously referenced into a compact piston-cylinder assembly.

As previously described, the features of the present invention provide a compact, accurate position detecting system without having to add any external componentry to the piston-cylinder assembly. This way, the size of the assembly is generally not increased and the sensor is isolated from any harmful elements, both internal and external. Further features and advantages of the present invention will become apparent to those skilled in the art upon review of the following specification in connection with the accompanying drawings.

BRIEF DESCRIPTION OF THE DRAWINGS

FIG. 7 is an enlarged scale showing of the circled area in FIG. 2 together with fiber optical sensors shown at the bottom.

FIG. 7a is a view, similar to that of FIG. 7, but showing the fiber optical sensors displaced an incremental amount to the right.

FIG. 7b is a view similar to that of FIG. 7a, but showing the fiber optical sensors further displaced an incremental amount to the right.

DETAILED DESCRIPTION OF THE PREFERRED EMBODIMENT

Figure 1:
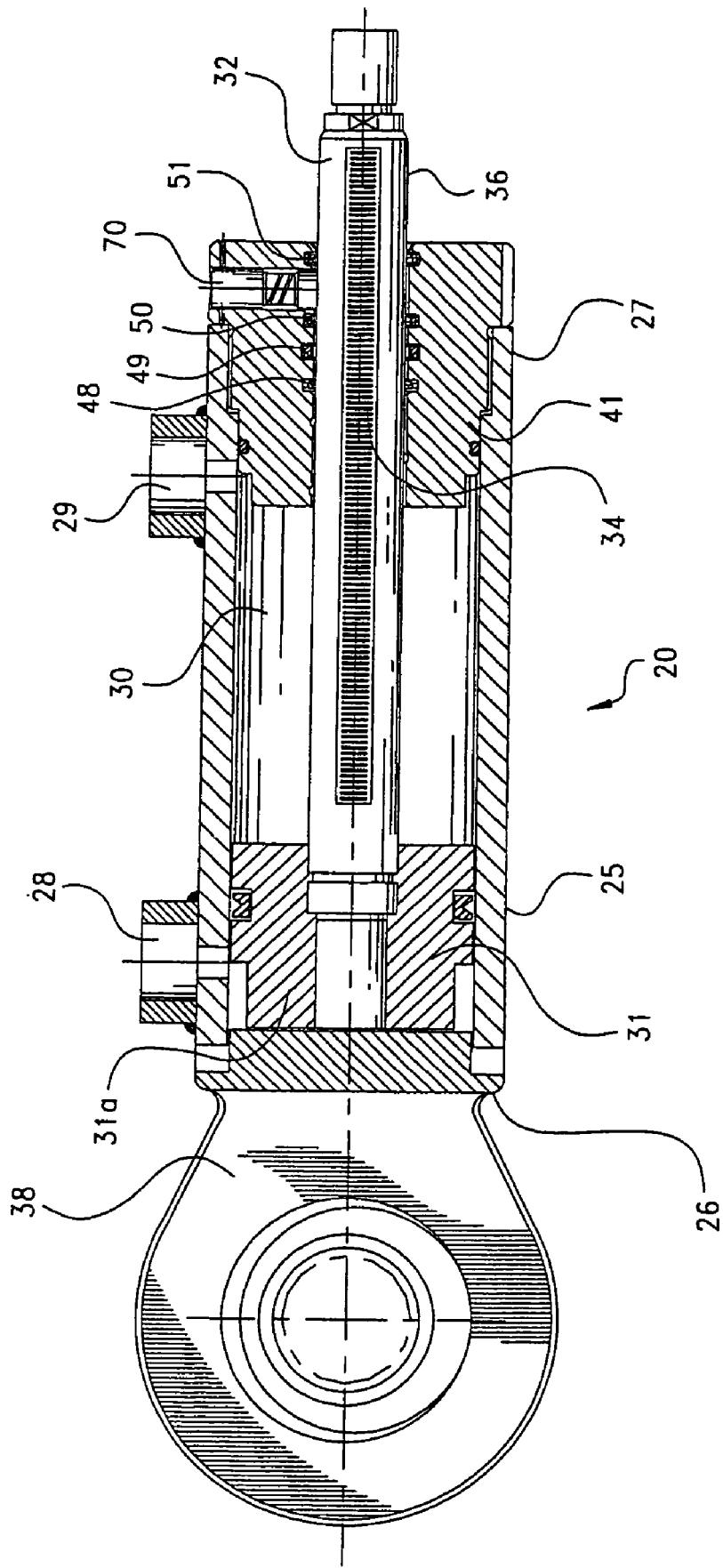
FIG. 1 is an overall longitudinal view, partly in cross-section, of a piston-cylinder assembly encompassing a first preferred embodiment of the present invention.

Referring now to the drawings and particularly to FIG. 1, a first preferred embodiment of this invention is shown generally at 20 in the form of a linear actuator of the piston-cylinder type. The main components include a cylinder 25, a piston assembly 31 comprised of a piston 31a and a piston rod 32, a seal gland 41, seals 48–51, a first cylinder port 28, a second cylinder port 29, and a sensor 70.

Figure 4:
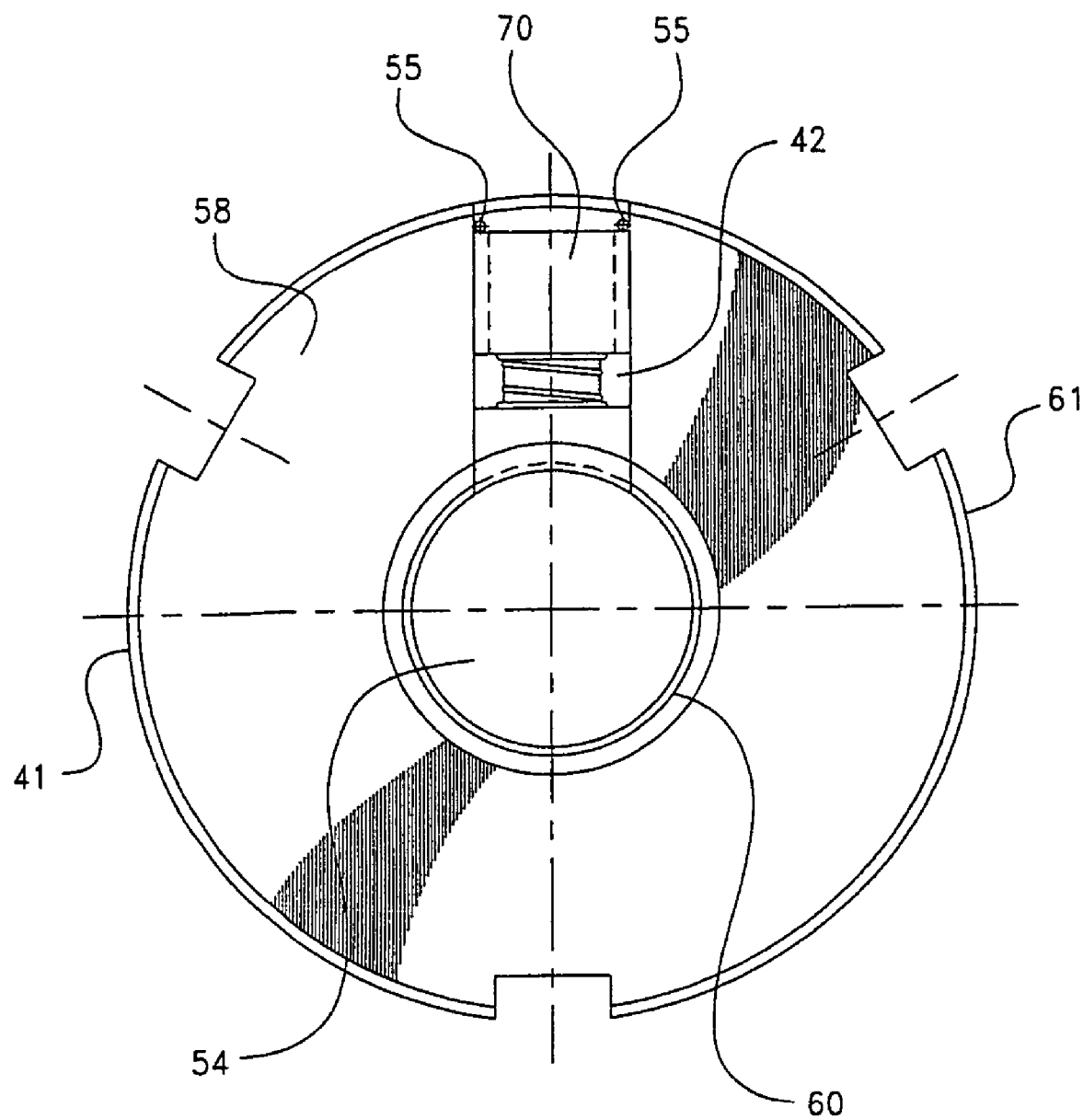
FIG. 4 is a view, partly in cross section view, of the seal gland taken along line 4—4 of FIG. 3 with the addition of a sensor.

Referring to FIGS. 1 and 4, a right circular cylinder 25 houses the piston assembly 31. Cylinder 25 has two opposed ends, one end 26 being closed by a cylinder tube coupling 38, while the other end 27 is adapted to receive apertured seal gland 41. Piston rod 32 has indicia markings 34 provided on at least a longitudinal portion of its peripheral surface 36. Piston rod peripheral surface 36 is preferably provided with a smooth, hard, wear coating, such as for example a hard chrome plated coating that is subsequently ground and/or polished in order to ensure a constant dimension outer diameter at least for its stroke length. As is well known to those skilled in the art, the piston assembly 31 and cylinder 25 can reciprocate relative to each other depending upon which end of the cylinder is pressurized. Pressure is supplied to cylinder 25 by any desired external pressure source (not shown) to first cylinder port 28 and exhausted via second cylinder port 29 and vice versa, depending on the desired direction of movement. Piston rod 32 moves through a central longitudinal aperture 54 in seal gland 41, with seal gland 41 closing the apertured end 27 of cylinder 25. Seal gland 41, in addition to its sealing function, is also adapted to receive an optical positioning sensing device or sensor 70 that is able to detect the precise position of piston assembly 31 and cylinder 25 relative to each other as well as the direction in which the piston assembly 31 is moving relative to the sensor 70.

Figure 2:
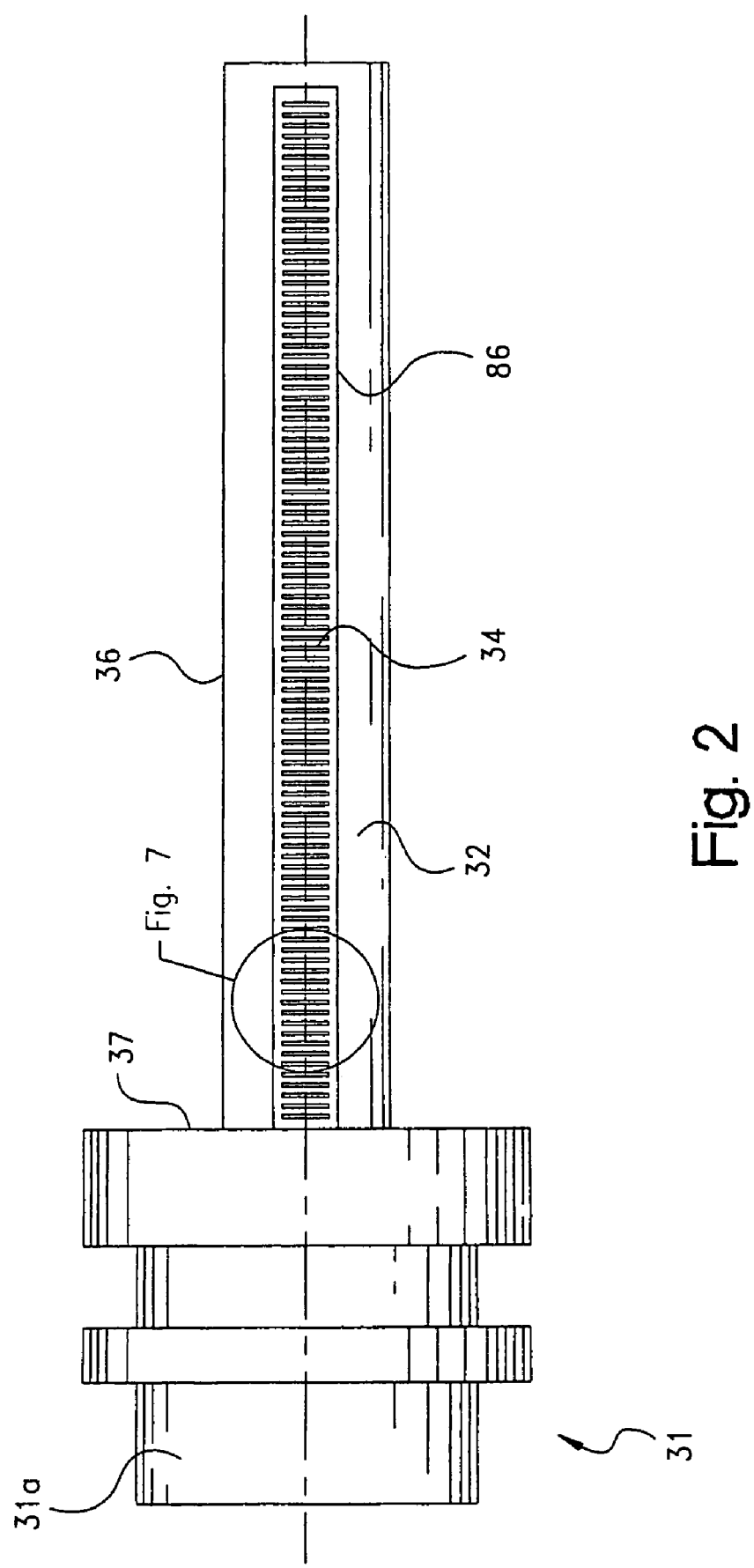
FIG. 2 shows a schematic piston and rod assembly with indicia markings on the rod peripheral surface used in the cylinder of FIG. 1.
Figure 3:
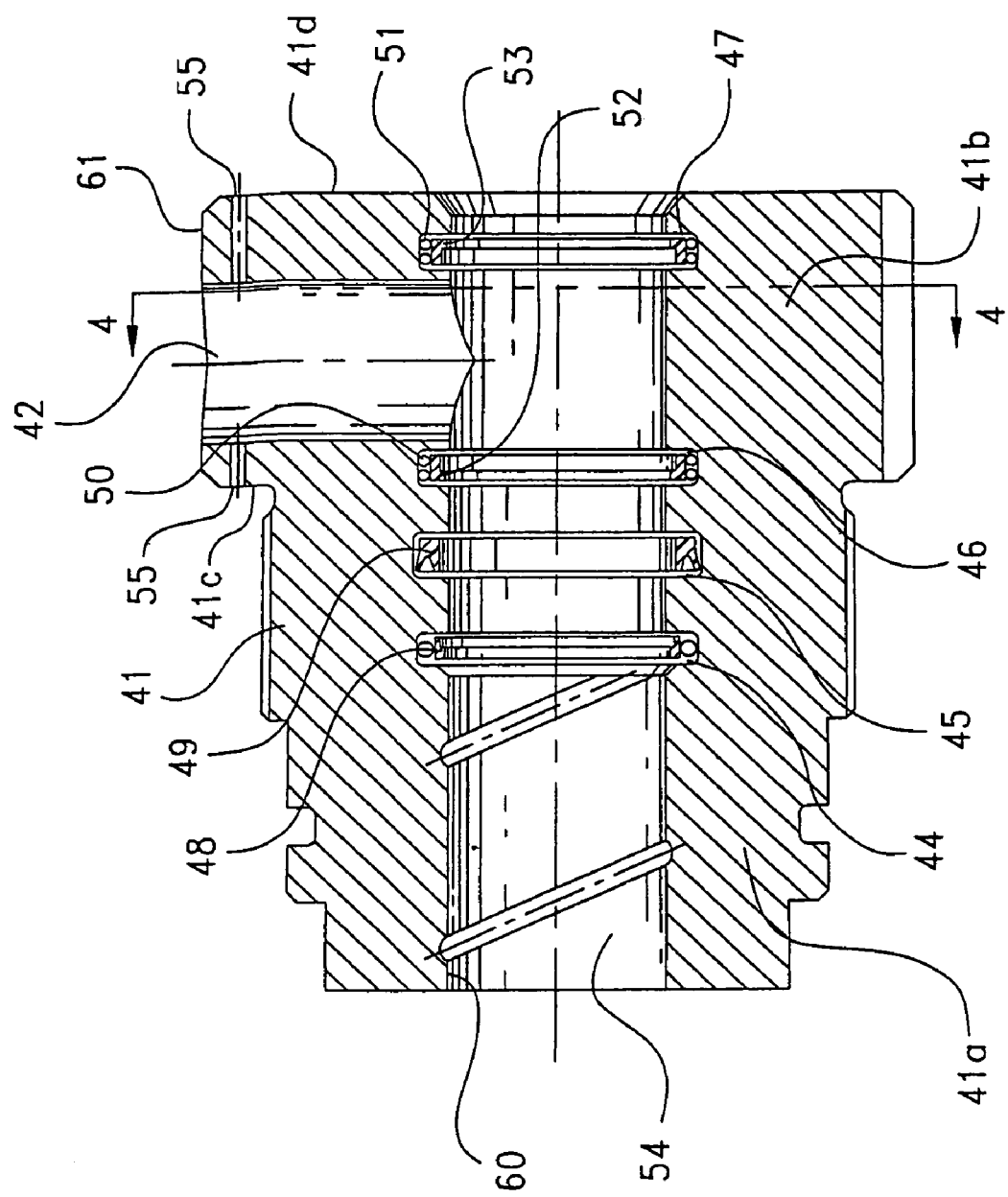
FIG. 3 is a longitudinal, cross-sectional view of a cylinder seal gland having a sensor mounting cavity.

Referring now to FIGS. 1 and 3, seal gland 41 is suitably removably affixed to cylinder 25 at its apertured end 27. Seal gland 41 is comprised of a first body section 41a and a second body section 41b. First body section 41a has an outside surface that mates and sealingly interacts with a corresponding inside surface of cylinder 25. Seal gland second body section 41b has an inner annular surface 41c that abuts the annular end surface of cylinder apertured end 27. The outer peripheral surface of seal gland second body section 41b is preferably flush with the outer peripheral surface of cylinder 25. Seal gland 41 also includes the noted central axial aperture 54 that allows reciprocating passage or movement of piston rod 32. Referring to FIGS. 2–4, an inner peripheral surface 60 of seal gland 41 is provided with a series of spaced circumferential recesses, 44–47, which serve to receive seals 48–51, respectively. Peripheral seals 48–51 function to provide a leak tight seal between piston rod peripheral surface 36 and seal gland inner peripheral surface 60. Referring again to FIGS. 1 and 4, it should be understood that the diameter of seal gland aperture 54 and the diameter of piston rod 32 are dimensioned in order to permit the smooth passage of piston rod 32 while preventing pressurized working fluid from migrating outside the pressurized volume or cavity 30 of cylinder 25. Referring to FIG. 1–4, seals 48 and 49 ensure that a fluid tight pressure seal is provided between piston rod peripheral surface 36 and seal gland inner peripheral surface 60. Seals 50 and 51 are positioned in recesses 46 and 47 respectively, and are located on opposite sides of a sensor cavity 42 (to be described hereinafter) and ensure that oil or any other contaminants do not migrate into sensor cavity 42.

Referring to FIGS. 1 and 3, a lip portion 52 of seal 50 is angled away from sensor cavity 42 and towards the body of cylinder 25. Lip portion 52 acts as a sealant and a wiper with reference to piston rod 32. This ensures that any fluid that collects on piston rod peripheral surface 36 does not enter sensor cavity 42 but rather remains in pressurized cavity 30. A lip portion 53 of seal 51 is likewise angled away from sensor cavity 42 and away from cylinder 25 and also acts as a sealant and a wiper with respect to piston rod 32. The direction of the action of seal 51 is opposite the direction of action of seal 50 and prevents any outside contaminants from entering seal gland aperture 54, and sensor cavity 42. While any desired seal material can be utilized, seals 50 and 51 are preferably made of a commercially available bronze filled polytetrafluoroethylene compound. Such a compound reduces the friction between seals 50, 51 and piston rod 32, while still providing the required sealing capabilities. Thus, a wet lubricant is not required to ensure the desired low friction. Due to the low friction characteristics of this seal material compound, the shape of seals 50 and 51 does not change appreciably. Seal 51 is positioned inside recess 47 in a compression fit towards piston rod 32 in order to have a constant inward force acting on piston rod 32. This further ensures proper sealing between piston rod 32 and seal gland 41.

Referring to FIGS. 1, 2 and 7, piston rod 32 has indicia markings 34 provided on its peripheral surface 36 in the form of optically discernible markings 81, preferably of an incremental scale type. Indicia markings 34 are provided on piston rod peripheral surface 36 by changing the molecular structure of those portions of piston rod surface 36 that correspond to the desired indicia markings, here in the form of a repeating line incremental scale 81 comprised of a plurality of equally spaced lines 81a. For example, lines 81a can be formed via the use of a CNC lathe having a programmed laser such as for example a Nd-YAG Laser, mounted on its tool post wherein the CNC lathe is utilized to both rotate the piston rod for the laser to generate lines 81a and for subsequently indexing the piston rod for successive indicia markings. It is believed that indicia markings 34 that result from the laser treatment change the molecular structure of the wear resistant peripheral surface 36 by annealing the surface material to a predetermined depth. It is theorized that the impingement of the laser beam, in the form of the desired indicia lines 81a, upon piston rod peripheral surface 36, produces a very high localized temperature for a very short duration of time, with the subsequent cooling or quenching thereof resulting in the noted annealed surface in the form of the desired indicia lines 81a. Another but different laser marking process is disclosed in U.S. Pat. No. 5,632,916 to Lappalainen. The noted molecular structural change in piston rod peripheral surface 36 provides detectable surface topography changes. These changes alter the light reflectivity for only the treated indicia markings or portions 34 of piston rod peripheral surface 36 in the noted incremental pattern 81 while not disturbing the surface geometry thereof in terms of surface finish and not altering the reflection angles of light of the non-treated portions of the wear coating of piston rod peripheral surface 36. Pattern 81 forms an incremental scale that can be recognized by sensor 70.

Figure 6:
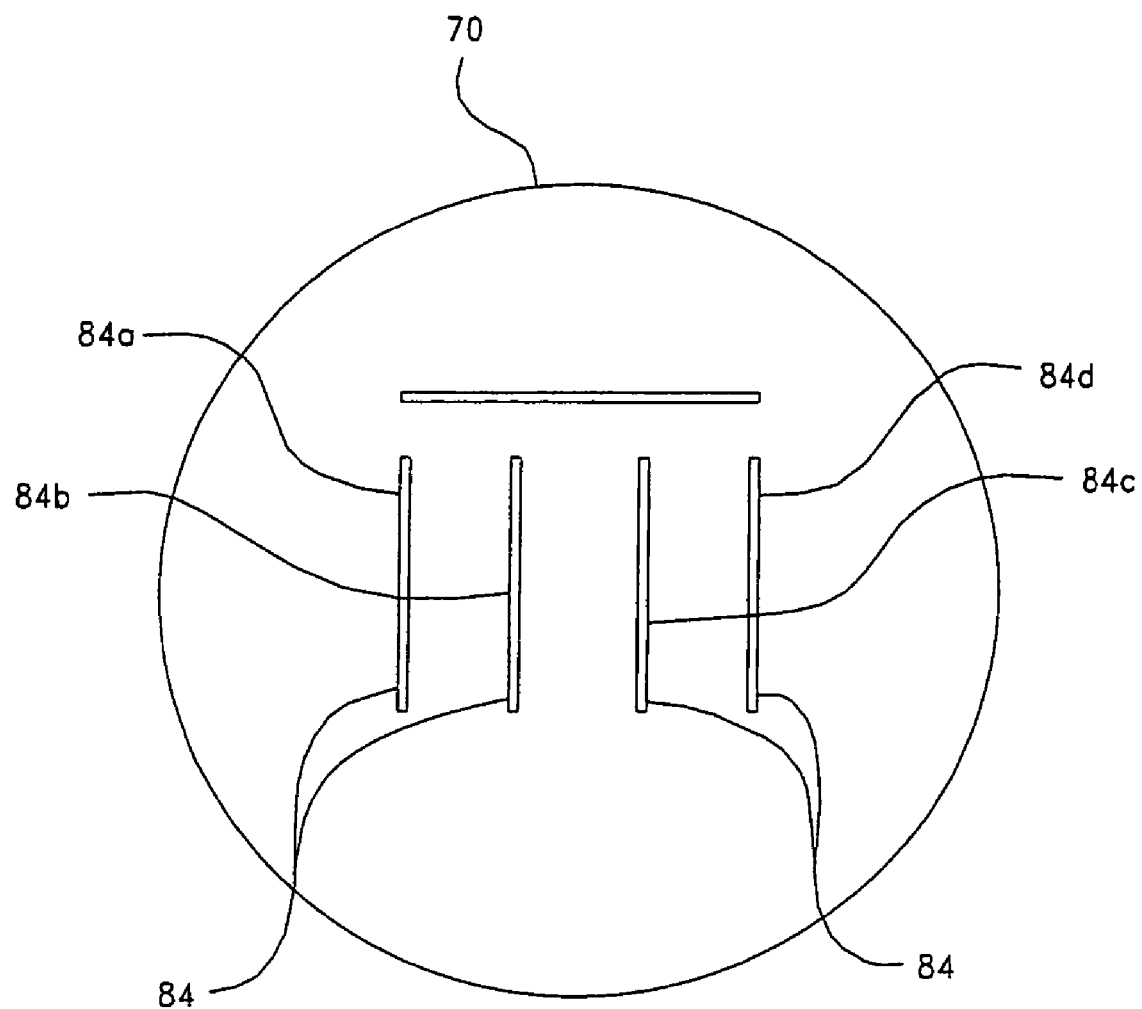
FIG. 6 is a view of the inner end surface of the sensor shown in FIG. 5.

Referring to FIGS. 1, 3, and 4, seal gland 41 is provided with a sensor cavity 42 that extends from seal gland aperture 54 radially outward to outer surface 61 of seal gland second body section 41b. Sensor 70, which is removably positioned within sensor cavity 42, preferably is a fiber optical type sensor that outputs a reading of the positions of piston rod 32 and cylinder 25 relative to each other in a manner to be described hereinafter. Referring again to FIG. 7, scale 81 is arranged so that the absolute position of piston rod 32 can be detected relative to a predetermined starting point. This will occur after piston rod 32 has moved a nominal distance relative to sensor 70. For example, each scale increment 81b is spaced 0.010 of an inch from its axially adjacent increments. Scale increment 81b is comprised of two portions, a marked portion 82 and an unmarked portion 83. Each portion has a width of 0.005 of an inch. Referring to FIGS. 6 and 7, four fiber optic sensor arrays 84 are positioned in sensor 70 in order to read the incremental pattern 81, and specifically to detect the change in reflected light from marked portions 82 to reflected light from unmarked portions 83, and vice versa. As best seen in FIG. 7, fiber optic sensor arrays 84 on sensor 70 are uniformly spaced at a quarter phase shift interval of the incremental markings 82 and 83 so that changes in fiber optic sensor arrays 84 do not occur simultaneously. The changes will occur in a predictable order so that a specific change pattern occurs which will then detail the direction of movement and the absolute location of piston rod 32 relative to a predetermined starting point in a manner to be described in more detail hereinafter.

For example, referring to FIGS. 1 and 7, as the incremental pattern 81 on piston rod 32 moves relative to fiber optic sensor arrays 84, the fiber optic sensor arrays will detect the changes from marked portions 82 to unmarked portions 83, and vice versa. This will enable fiber optic sensor arrays 84 to determine the precise location of the piston assembly 31 relative to cylinder 25. Assuming a starting position as shown in FIG. 7 and an ending position as shown in FIG. 7a, when piston rod 32 moves to the left at 0.0025 of an inch increments, sensor arrays 84 will detect the following changes. Sensor 84a will not detect any change, since sensor 84a will begin viewing marked portion 82a and end viewing at marked portion 82a. Sensor 84b will detect a change since it began viewing marked portion 82b and ended viewing unmarked portion 83b. Sensor 84c will not detect a change since it begins viewing unmarked portion 83 and ends at viewing unmarked portion 83c. Sensor 84d will also detect a change from unmarked portion 83 to marked portion 82e. Hence, while sensor 84a detects a movement from a marked portion to another marked portion there is no change. Sensor 84b detects a change from a marked portion to an unmarked portion. Sensor 84c also detects a movement from an unmarked portion to another unmarked portion but again there is no change. Finally, sensor 84d detects a change from an unmarked portion to a marked portion.

This sequence of the noted changes and no changes allows the sensor 70 to detect both the direction of movement and the precise position of piston assembly 31 relative to cylinder 25. To further illustrate this sequence, (assuming a starting position as shown in FIG. 7a and an ending position as shown in FIG. 7b) when piston assembly 31 moves to the left again at 0.0025 of an inch with respect to cylinder 25, sensor 70 will detect the following changes: Sensor 84a will detect a change, since it begins viewing at marked portion 82a and ends at unmarked portion 83a. Sensor 84b will not detect a change since it both begins and ends viewing at unmarked portion 83b. Sensor 84c will detect a change since it begins viewing at unmarked portion 83c and ends at marked portion 82d. Sensor 84d will not detect any change since it begins and ends viewing at marked portion 82e. Hence, fiber optic sensor 84a detects a change from marked portion to an unmarked portion. While sensor 84b detects a movement from an unchanged portion to another unchanged portion, there is no change. Sensor 84c detects a change from an unmarked portion to a marked portion while sensor 84d detects a movement from a marked portion to another marked portion there is no change. This sequence of the noted changes and no changes again allows the sensor 70 to detect both the direction of movement and the precise position of piston assembly 31 relative to cylinder 25. As one skilled in this art will understand from this example, the piston assembly has to move only 0.0025 of an inch in order for sensor 70 to both detect the position as well as the direction of movement of piston assembly 31 relative to cylinder 25.

Referring again to FIG. 2, preferably indicia markings 34 on piston rod 32 extend from at least an inner annular surface 37 of piston 31a to the location where sensor 70 initiates its sensing function relative to piston rod 32 when piston rod 32 is fully retracted. This extent of the indicia markings 34 thus coincides with at least the full stroke of the piston assembly 31 within cylinder 25. Indicia markings 34 are preferably formed on piston rod surface 36 in a longitudinal band 86 and the width of the indicia band has to exceed the possible degree of relative rotary movement between the piston and the cylinder. For example, it is known that in such installations, due to the use of self-aligning bearings, piston rod 32 and cylinder 25 can each rotate about +/−7°. Thus, the maximum relative degree of rotation between the piston and the cylinder is about 14°. The width of the indicia band must therefore exceed this maximum degree of rotary movement so that the misalignment tolerance does not cause band 86 to be angularly outside of the field of view of sensor 70.

Referring back to FIG. 1, during the operation of piston-cylinder device 20, sensor 70 is able to detect the incremental scale, piston rod indicia markings 34. When cylinder 25 receives pressure from an external source through its first cylinder port 28, piston assembly 31 will move away from the closed end 26 of the cylinder towards the apertured end 27 of the cylinder. Sensor 70 will be able to detect the displacement of piston assembly 31 by continually ascertaining indicia markings 34. This enables a continuous and precise detection of the positions of piston assembly 31 and cylinder 25 relative to each other and more specifically the precise location of piston rod 32 relative to cylinder 25, within the limits of the stroke of piston rod 32, at all times.

Referring to FIGS. 1–4, during operation, in order to achieve a desired position of the piston rod 32 relative to cylinder 25, pressurized fluid may be supplied to either of cylinder ports 28 or 29. During the extension of piston rod 32 fluid is supplied through inlet port 28. Seals 48–50 prevent any pressurized fluid from leaking past the seal gland 41, into sensor cavity 42 or past the cylinder apertured end 27. Specifically, lip portion 52 of seal 50 will wipe away any fluid that has remained on piston rod peripheral surface 36. Due to the previously noted dimensioning of piston rod 32 and seal gland aperture 54 as well as the utilization of seals 48–50, sensor 70 is not exposed to any pressure or pressurized fluid and thus cannot be adversely affected by it. During the retraction of piston rod 32, fluid is supplied through second cylinder port 29. Seal 51 prevents any outside fluid or contaminants that have collected on piston rod 32 from entering sensor cavity 42. Specifically, lip portion 53 of seal 51 will wipe away any material that has collected on piston rod peripheral surface 36. Thus, sensor 70 will not be adversely affected by any outside contaminants. The unique physical location of sensor 70, inside seal gland 41, ensures that sensor 70 will function in its intended manner. Pressure, pressurized fluid, and outside contaminants can adversely affect the functionality of sensor 70. Protecting sensor 70 from being exposed to fluid pressure and outside contaminants ensures its precision and longevity.

Referring to FIGS. 1, 3 and 4, sensor 70 can be inserted and affixed within sensor cavity 42 by means of any desired retaining fastener (not shown). For example, known spring type retaining fasteners are housed within axial cavities 55 that extend from the outer annular surface 41*d* to inner annular surface 41*c* of seal gland second body section 41*b*. The retaining fastener contacts and affixes sensor 70 within sensor cavity 42. If necessary, sensor 70 can readily be removed and/or replaced from seal gland 41 by removing the retaining fastener from axial cavities 55. This can be done without disturbing any other components of cylinder 25, such as piston assembly 31 or seals 48–51. Due to its location in seal gland second body section 41*b*, sensor 70 is positioned outside cylinder pressure cavity 30. Thus, by specifically locating sensor 70 outside of the cylinder pressure cavity 30 and within radial sensor cavity 42 in the existing seal gland 41, operating precision is ensured, the original design, or fabrication, of cylinder 25 and piston assembly 31 is not substantially altered, and servicing of both the piston cylinder assembly 20 and sensor 70 can be performed without affecting the functionality of either.

Again referring to FIG. 1, by incorporating sensor 70 into seal gland 41, the overall length of the cylinder unit is increased only by the distance (diametral dimension) needed to house sensor 70. This incorporation utilizes an existing part, seal gland 41, and in combination with indicia markings 81 adds an additional function, namely the position sensing of piston assembly 31 and cylinder 25 relative to each other. An externally attached sensor reading component, such as the addition of a separate radially extending sensing component onto cylinder end 27, will complicate the cylinder unit and add to its size and weight. Cylinders of the type using the present invention are often used on mobile equipment and added external componentry can easily be damaged during use. Such added componentry can also be adversely affected by outside elements such as weather and contaminants.

Figure 5:
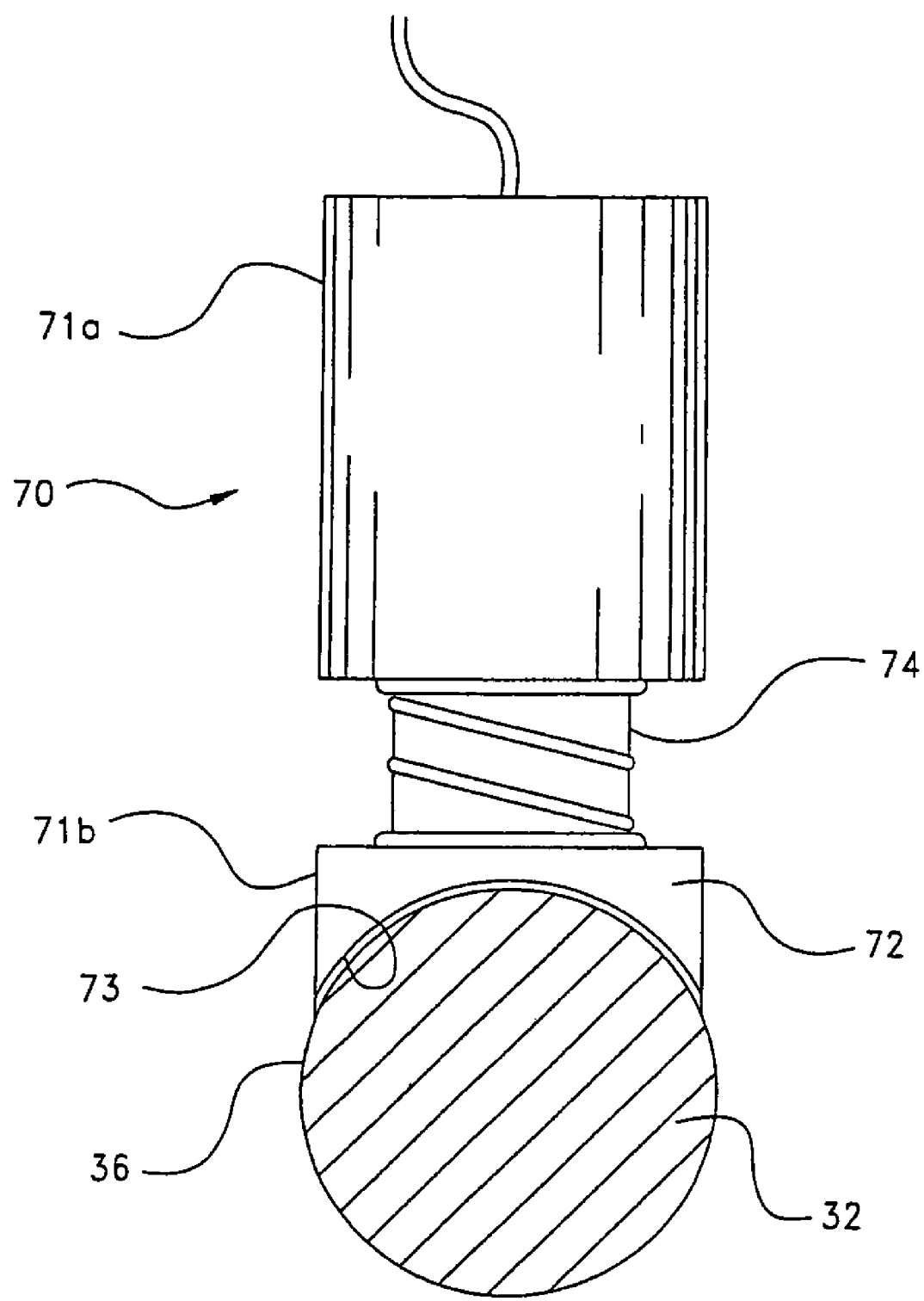
FIG. 5 is a simplified end surface view of the sensor adjacent to the piston rod.

Referring to FIGS. 3 and 5, sensor 70 preferably is a fiber optical sensor having a first end 71*a* and a second end 71*b*, the latter being equipped with a spring-loaded collar 74 that is used to apply a constant force onto the slipper element 72. When positioned inside sensor cavity 42, first end 71*a* extends radially outward. Contact wires are attached to sensor first end 71*a* in order to communicate the sensor readings to a location accessible to operator perusal, such as the dashboard of the vehicle, for example. Slipper element 72 is preferably manufactured from a wear resistant, synthetic resinous plastic material, such as Delrin®, in order to ensure that its geometry does not change and to provide a low coefficient of friction. An inner surface 73 of slipper 72 has a curvilinear shape in order to substantially conform to the curvature of piston rod peripheral surface 36. Referring to FIGS. 1, 2 and 5, slipper element inner surface 73 slidably mates with piston rod peripheral surface 36 and is specifically superimposed relative to the width of longitudinal band 86. Referring to FIGS. 6 and 7, four fiber optic sensor arrays 84 are each comprised of a plurality of light emitting fibers 87 and light receiving fibers 88 arranged in an alternating and repeating order. Referring to FIGS. 1, 5, and 6, slipper element 72 radially spaces or separates the ends of the four optic sensor arrays 84 of sensor 70 from piston rod indicia markings 34 for a predetermined distance to ensure precise optical reading of the alternating reflected light portions. Upon movement of one of cylinder 25 and piston rod 32, the four optic sensor arrays 84 detect and count signals of successive (both positive and negative) incremental indicia markings 34 by either receiving reflected light from unmarked portions 83 or by not receiving reflected light from marked portions 82. These signals are converted, in a well known manner, from an optical signal to an electronic signal, which is generally denominated as a count. This resulting count can be either positive or negative. By adding to or subtracting from the previous total count, the exact linear position of cylinder 25 and piston assembly 31 relative to each other can therefore be determined. This optical to electronic conversion, which is accomplished via any desired commercially available system, is preferably made directly within sensor 70 or at a remote location.

Figure 8:
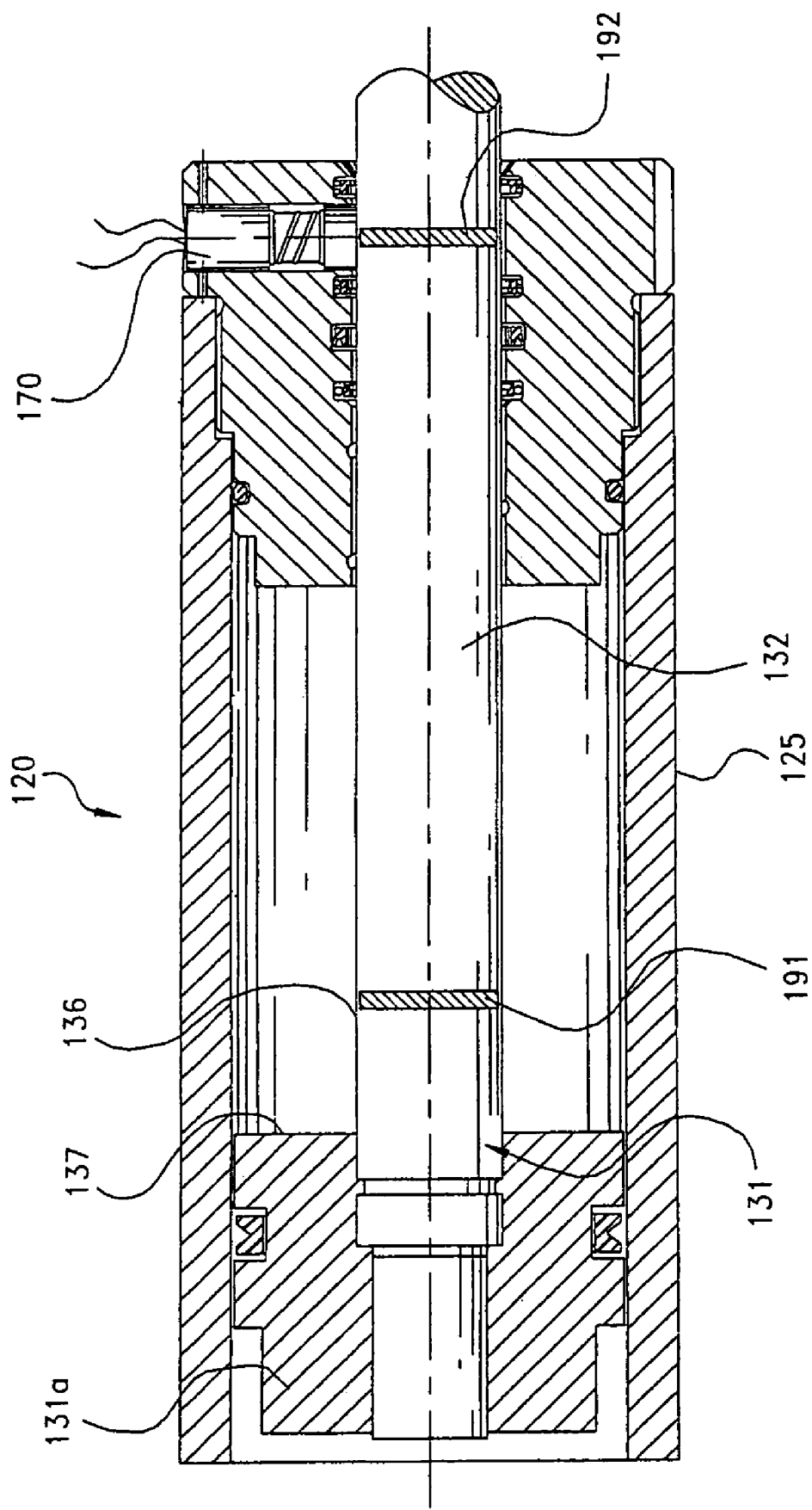
FIG. 8 is an overall longitudinal view, partially in cross-section, of components of a piston/cylinder assembly encompassing a second preferred embodiment of this invention.

As a second embodiment 120 of the present invention, which pertains only to "discrete" indicia markings, is illustrated by the piston assembly 131 in FIG. 8. A preferably fiber optic sensor 170 detects only one or several discrete positions such as either a fully retracted, a fully extended, or any desired other position of piston rod 132. Such an arrangement is commonly known in the industry as an end of stroke sensing arrangement although most known systems rely on externally mounted mechanical or electronic proximity limit switches to provide the desired information. Preferably, only two indicia markings are required on piston rod 132. A first indicia mark 191 is placed on piston rod peripheral surface 136 at a location spaced from piston annular end surface 137 so that its presence can be detected by sensor 170 when piston rod 132 is fully extended. A second indicia mark 192 is placed on piston rod peripheral surface 136 at a location directly radially inwardly of sensor 170 in the manner shown in FIG. 1 so its presence can be detected by sensor 170 when piston rod 132 is fully retracted. First mark 191 and second mark 192 thus coincide with the full extension and retraction locations of piston 131*a*, respectively. Therefore, sensor 170 will only detect the position of piston rod 132 and cylinder 125 relative to each other at the beginning and the end of the piston stroke.

A variation of the aforementioned set-up would be a mid-stroke sensing arrangement, in which a single indicia mark (not shown) is placed on the piston rod half way between the fully retracted and fully extended position. Sensor 170 would then provide information of the center stroke position, which is desired, for example, in vehicle steering applications. End of stroke and mid stroke sensing arrangements may of course also be combined if so desired, by using these indicia marks. Indicia marks such as 191, 192, etc., preferably are formed on piston rod peripheral surface 136 in the manner described with reference to first embodiment 20. A simplified marking, such as that of embodiment 120, is employed when the user is only concerned with the location of piston 131*a* in desired discrete positions without having to know other positions. Optical sensor 170 is a simplified version of sensor 70 previously described, with reference to the first embodiment 20 shown in FIGS. 1–7, in that only two fiber optic sensing arrays 84 are required. By comparing the amount of light received by both fiber optic sensing arrays 84, the direction and presence of discrete indicia marks 191 and 192 can be detected. If indicia marks 191 and 192 are blocking the light reflection of one array, sensor 170 can detect its presence and can determine in which direction piston 131*a* is travelling.

A further embodiment (not shown) of the present invention includes the use of absolute scale markings on the piston rod peripheral surface rather than the use of the incremental scale marking of the noted first embodiment. This embodiment is similar to the piston-cylinder assembly in the previous embodiments except for this marking change. An absolute scale marking allows the detection of an absolute position anywhere within the marked range contrary to the aforementioned incremental markings, which allow the detection of a position relative to a known reference point. This embodiment further includes an alternative marking technique of the piston rod surface utilizing the photosensing technology that is fully depicted and described in U.S. Pat. No. 5,693,935 to Hassler, Jr. et al., which is also assigned to the assignee of the present invention. As explained in the Hassler, Jr. et al. patent, this alternative marking technique provides indicia markings in the form of a scale tube. The indicia markings take the form of a predetermined series of rings and spacers that have differing light reflection characteristics. In this further embodiment, the required optical sensor remains positioned inside the seal gland, as in the earlier embodiments of this invention, and houses the required probe. Markings on the piston rod, akin to the noted rings and spacers but provided in the manner described with reference to first embodiment 20, will enable detection of the absolute position of the piston rod.

What is claimed is:

1. An apparatus for sensing movement of a first object relative to a second object, the apparatus comprising:
   indicia markings formed on the first object;
   a sensor capable of reading the indicia markings, the sensor being supported in a radial bore of the second object; and
   a slipper element biased into engagement with the first object and spacing the sensor radially away from the first object by a predetermined distance.

2. The apparatus of claim 1 wherein the sensor is a fiber optical sensor.

3. The apparatus of claim 1 wherein the first object is a piston rod of a piston assembly and the second object is a cylinder, the piston assembly and cylinder forming a portion of a fluid pressure operated actuator.

4. The apparatus of claim 1 wherein the sensor is located within a sealing gland, the sealing gland isolating the sensor from working fluid.

5. The apparatus of claim 1 wherein the slipper element is formed from a wear resistant material having a low coefficient of friction.

6. The apparatus of claim 5 wherein an end of the slipper element is shaped so as to conform to a peripheral surface of the first member.

7. An apparatus for sensing movement of a piston assembly relative to a cylinder, the apparatus comprising:
   indicia markings formed on a peripheral surface of a rod portion of the piston assembly;
   a radial bore extending into a sealing gland portion of the cylinder;
   a sensor capable of reading the indicia markings, the sensor being supported in the radial bore; and
   a slipper element biased into engagement with the peripheral surface of the rod portion of the piston assembly and spacing the sensor radially away from the indicia by a predetermined distance.

8. The apparatus of claim 7 wherein the sensor is a fiber optical sensor.

9. The apparatus of claim 7 wherein the sensor, when located within the sealing gland portion of the cylinder, is isolated from working fluid located within the cylinder.

10. The apparatus of claim 7 wherein the slipper element is formed from a wear resistant material having a low coefficient of friction.

11. The apparatus of claim 10 wherein an end of the slipper element is shaped so as to conform to a peripheral surface of the first member.

* * * * *